United States Patent Office 3,620,094
Patented Nov. 16, 1971

3,620,094
FLAT-LINK CHAIN
Ilya Ilich Ivashkov, 9 Parkovaya ulitsa 43/26, kv. 198, and Vasily Alexandrovich Frolovtsev, Ferganskaya ulitsa 18, kv. 263, both of Moscow, U.S.S.R.
Filed Jan. 2, 1970, Ser. No. 277
Claims priority, application U.S.S.R., Feb. 18, 1969, 54/94
Int. Cl. F16g 13/02
U.S. Cl. 74—251 R
1 Claim

ABSTRACT OF THE DISCLOSURE

Flat-link chains, wherein the hinge joints of the links are formed by support members secured in the end portions of the plates and contacting one another with their outer working surfaces, of which one is convex and the other is concave, whereupon the space between adjacent support members with a concave working surface being made greater than the space between adjacent support members with a convex working surface.

Proposed chain is highly reliable and durable.

The present invention relates to the sphere of machine-building and, more particularly, to chain drives and designs of flat-link chains.

Known in the prior art are flat-link chains, wherein the hinge joints of the links are formed by support members secured in the end portions of the plates and contacting one another with their outer working surfaces, of which one is convex and the other one is concave (cf., U.S.S.R. Inventor's Certificate No. 187,461). In such chains the support members with a concave working surface are built into internal plates provided with openings for passage of the support members with a convex working surface, built into the external plates.

In such chains the openings provided in the internal plates and designed for passage of the support members with a convex working surface loosen the fitting of the support members with a concave working surface in the internal plates. Therefore, in the case of interaction of the sprocket teeth with the support members having a concave working surface, the strength of fixation of these members may be in some cases substantially lowered by continuous collision of the sprocket teeth with said support members, which decreases the reliability and working capacity of the chain as a whole. This may be avoided by selecting the interacting sprocket and chain in such a manner that the pitch of the sprocket is twice as great as that of the chain. In this case, the chain drive may be assembled so that in the course of interaction of the chain with the sprocket no tooth is disposed in the clearance of the chain between adjacent support members with a concave working surface, and the teeth of the sprocket contact only the support members with a convex working surface. However, correct mounting of the chain on the sprockets requires in this case greater attention and may be distorted in case the above-described chain is handled by insufficiently skilled personnel.

Besides, the wear-resistance of the sprockets in this drive is considerably decreased.

The present invention has as its task the provision of such a flat-link chain that would interact with the teeth of the sprockets only by the support members with a convex working surface, no matter what the mutual disposition of the chain and the sprocket. This would raise the reliability and durability of the flat-link chain, for the fitting of the support members with a concave working surface would not be loosened in the course of the chain drive operation.

This task is accomplished by means of a flat-link chain, the hinge joints of whose links are formed by support members secured in the end portions of the plates and contacting one another by their outer working surfaces of which one is convex and the other one concave, in which the space between adjacent support members with a concave working surface is made greater than the space between adjacent support members with a convex working surface.

It is an object of the present invention to eliminate the afore-mentioned disadvantage.

The following description of an exemplary embodiment of the present invention is given with reference to the accompanying drawings, in which.

Figure 1:
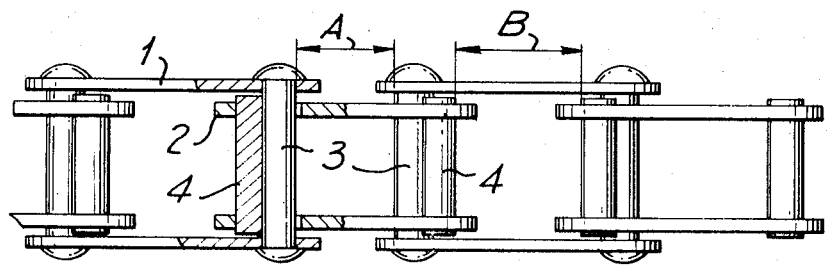
FIG. 1 shows a partial section of the flat-link chain, according to the invention.

The flat-link chain comprises external plates 1 (FIG. 1), internal plates 2, support members 3 with a convex working surface and support members 4 with a concave working surface (here by the working surface is meant the portion of the support member surface with which it contacts another support member). The support members 3 are stationary secured in the external plates 1 and pass freely through the openings provided in the internal plates 2, whereas the support members 4 are stationary secured in the internal plates 2.

The support members 3 and 4, forming the hinge joints of the chain, may turn freely relative to one another, remaining, at the same time, stationary relative to the plates in which they are secured.

Figure 2:
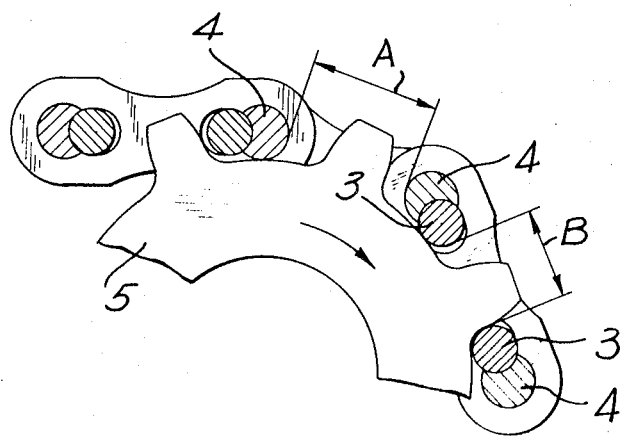
FIG. 2 shows the diagram of interaction of the flat-link chain according to the invention with the sprocket.

The space A (FIG. 2) between adjacent support members 4 with a concave working surface is made greater than the space B between adjacent support members 3 with a convex working surface. This embodiment of the chain provides for contact of the teeth of the sprocket 5, no matter what its disposition with respect to the chain, only with the support members 3 (the arrow indicates the direction of rotation of the sprocket 5). This prevents collision of the teeth of the sprocket 5 with the support members 4, thus eliminating the loosening of their fitting in the plates 2 and, hence, raising the reliability and durability of the flat-link chain as whole.

The proposed plate chain may be made as a single-row or multi-row one, as well as a driven and traction one (a conveyor one, provided with a special joining device).

What is claimed is:

1. A flat-link chain comprising: plates; hinge joints of said plates; support members with an outer convex working surface; support members with an outer concave working surface; said support members contacting one another in pairs with their said working surfaces, thus forming said hinge joint, the space between adjacent said support members with a concave working surface being made greater than the space between adjacent said support members with a convex working surface.

References Cited
UNITED STATES PATENTS
1,863,606    6/1932    Perry _____ 74—255 R
FOREIGN PATENTS
276,814    8/1930    Italy.

LEONARD H. GERIN, Primary Examiner

U.S. Cl. X.R.
74—255 R